UNITED STATES PATENT OFFICE.

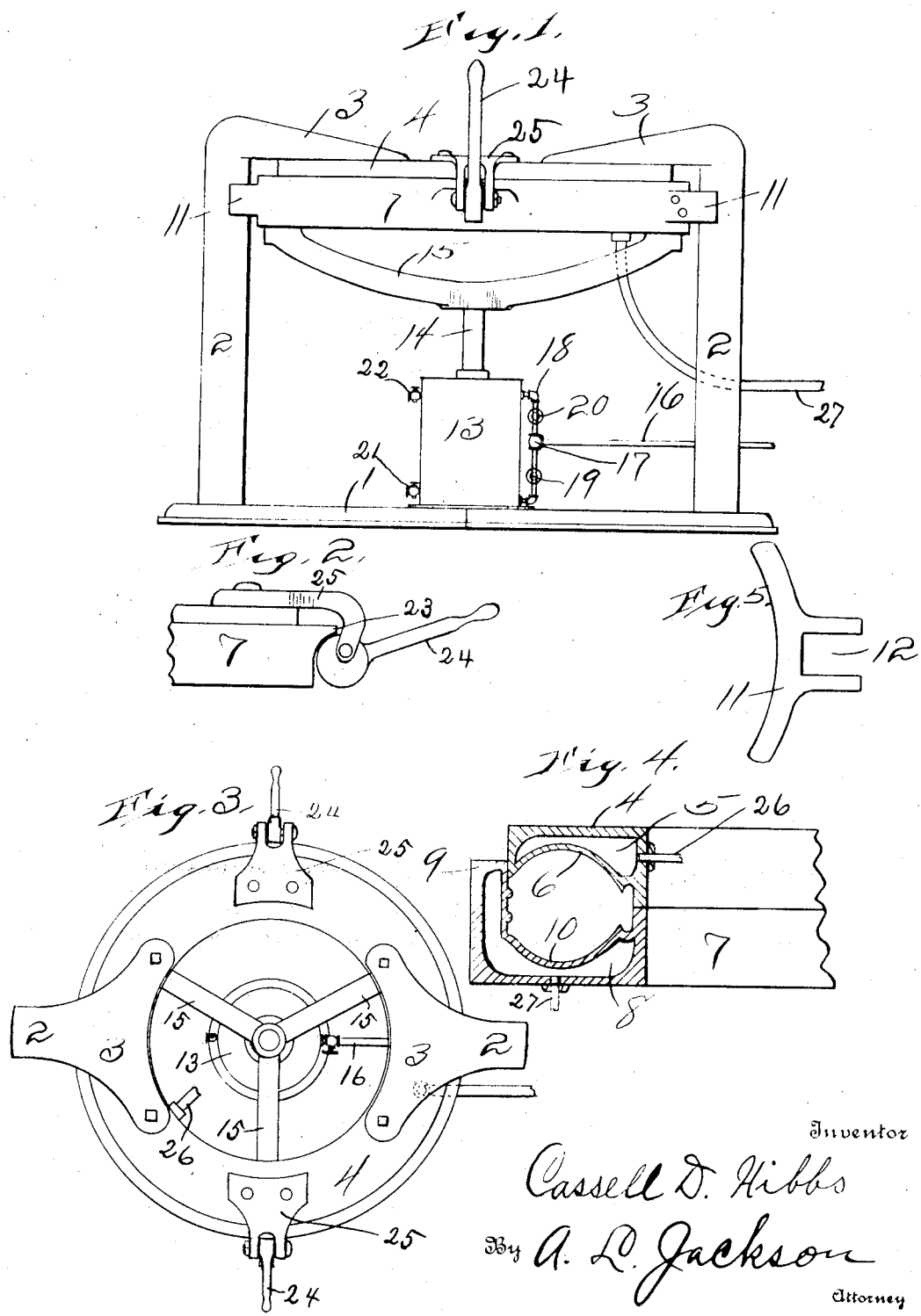

CASSELL D. HIBBS, OF FORT WORTH, TEXAS.

ADJUSTABLE TIRE-MOLD.

1,361,764.	Specification of Letters Patent.	Patented Dec. 7, 1920.

Application filed July 1, 1919. Serial No. 308,011.

*To all whom it may concern:*

Be it known that I, CASSELL D. HIBBS, a citizen of the United States of America, residing at Fort Worth, in the county of Tarrant and State of Texas, have invented certain new and useful Improvements in Adjustable Tire-Molds, of which the following is a specification.

My invention relates to molds for tire casings and the like, and the object is to provide molds which will be highly efficient and which can be quickly adjusted and dismantled and which can be easily adjusted to operative and to inoperative positions. Another advantage is that the molds will be perfectly true when in operative position and the steam chambers are so arranged that the heat will be properly distributed. Other objects and advantages will be fully explained in the following description and the invention will be more particularly pointed out in the claims.

Reference is had to the accompanying drawings which form a part of this application.

Figure 1 is a side elevation of the improved molds. Fig. 2 is a detail view, illustrating the binding of the upper and lower members of the mold. Fig. 3 is a plan view of the upper member of the mold. Fig. 4 is a vertical cross-section of the mold. Fig. 5 is a plan view of one of the guides for the lower or movable member of the mold.

Similar characters of reference are used to indicate the same parts throughout the several views.

The improved mold is provided with a base 1 which may be quadrangular. Upright frame members 2 are secured to the base 1 and these members have horizontally projecting members 3 which are attached to and carry the upper mold member 4. The member 4 is stationary and is provided with a circular cavity 5 therein for circulation of a heating element. The member 4 has also a curved cavity 6 in the underside of the mold for receiving one side of a tire casing. The lower member 7 of the mold is the movable member and is somewhat L-shaped in cross-section and has a circular cavity 8 which is L-shaped in cross-section. The member 7 has a curved circular cavity 10 facing the curved circular cavity 6 of the upper member 4 for receiving the tire casing. The member 4 is in part inclosed by the upstanding portion 9 of the lower mold member 7 so that the members will aline perfectly when brought together. The member 7 is guided in its vertical movement by yokes 11 which are attached thereto and which have recesses 12 to receive the uprights 2. The member 7 is moved vertically by compressed air and means are provided for utilizing compressed air. A cylinder 13 is mounted on the base 1. The cylinder 13 is provided with a plunger 14 of ordinary construction which is attached to a spider 15 and the spider 15 is attached to the member 7. Means are provided for letting in compressed air above and below the plunger head. A pipe 16 leads to any suitable supply source of compressed air. Branch pipes 17 and 18 are connected to pipe 16 and to the lower and upper parts of the cylinder 13 and provided with cocks 19 and 20 so that compressed air may be supplied below and above the plunger head. When the mold 7 is to be raised, compressed air is turned in the cylinder 13 through pipe 17 and when the mold 7 is to be lowered, compressed air is turned into cylinder 13 through pipe 18. Cocks 21 and 22 are provided for releasing the compressed air below and above the plunger when necessary for operation. Means are provided for locking the member 7 in the elevated position. The members 7 are provided with supporting lugs 23 and eccentric levers 24 are fulcrumed in brackets 25 which are attached to member 4 for engaging the lugs 23. The object is to provide means by which the molds can be quickly locked together and unlocked and by which the molds will be firmly locked or pressed together for molding purposes. A heating element, such as steam, is conveyed to the member 4 through a pipe 26 and a flexible pipe 27 is used to convey a heating element to the member 7.

What I claim, is,—

1. Adjustable molds for tires comprising a fixed upper member having a molding cavity in the under side, means for heating said member, a lower movable member having a cavity in the upperside coöperating with said upper member and having a rim portion of greater diameter than said upper member and circumscribing a portion of said upper member for holding said members concentric during the molding operation, guides for said lower member, means for heating said lower member, pneumatic means for moving said lower member vertically, and means for locking said lower member to said upper member during a curing operation comprising projecting lugs on said lower member and eccentric levers fulcrumed on said upper member.

2. Adjustable molds for curing tires and the like comprising an upper member, a frame for fixedly mounting said upper member, means for heating said upper member, a lower movable member having guiding yokes loosely engaging said frame, pneumatic means for moving said lower member vertically, and means for locking said lower member to said upper member during a curing operation consisting of fulcrum yokes attached to said upper member, projecting lugs on said lower member and levers fulcrumed in said fulcrum yokes and provided with cams for engaging said lugs.

In testimony whereof, I set my hand, this 27th day of June, A. D. 1919.

CASSELL D. HIBBS.